May 5, 1970     W. R. PIERIE ET AL     3,509,582
HEART VALVE WITH PLASTIC COVERED CAGE LEGS
Filed July 3, 1967
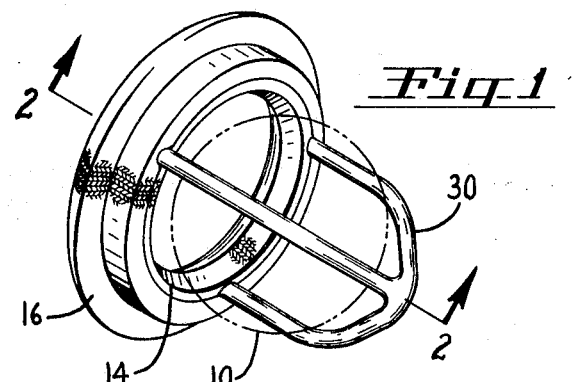
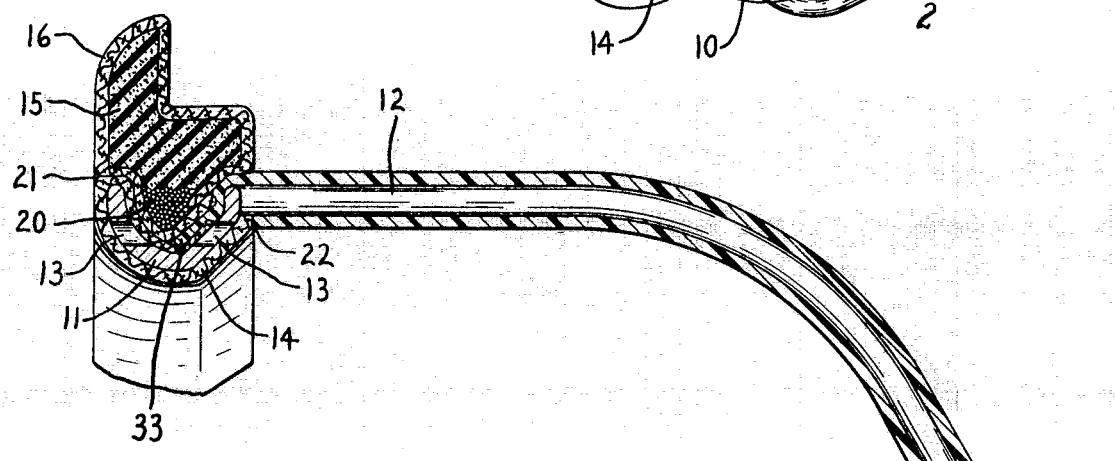
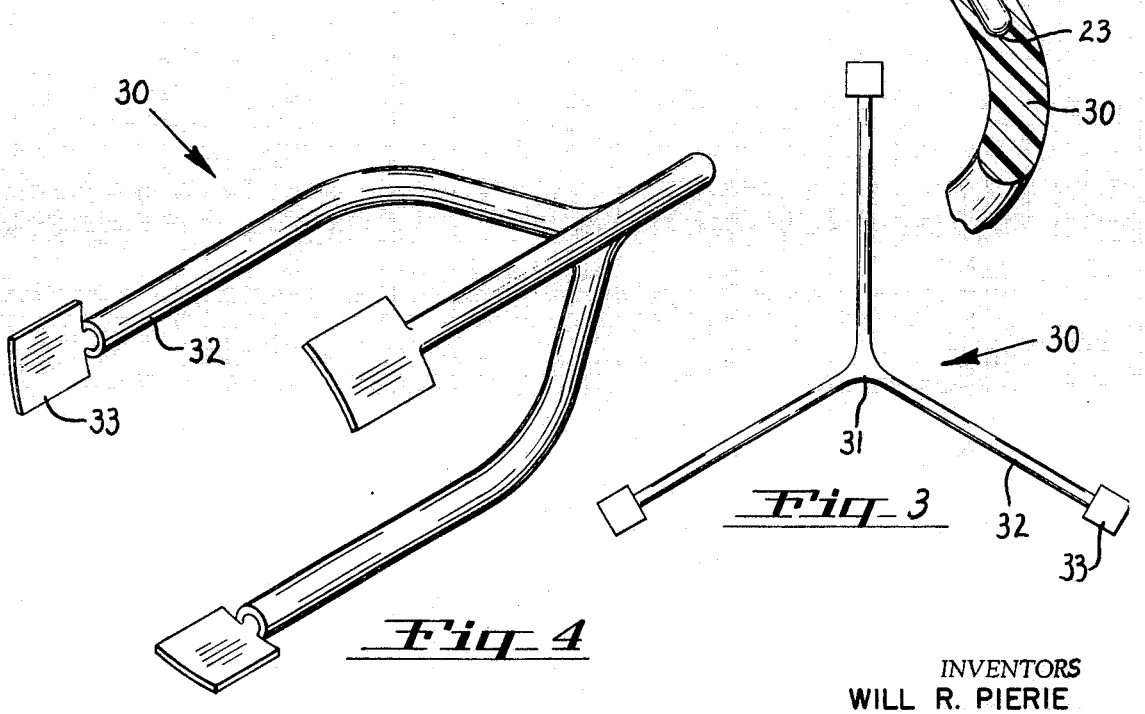
INVENTORS
WILL R. PIERIE
DONALD A. RAIBLE
BY
*Lee R. Schermerhorn*
Attorney

United States Patent Office 3,509,582
Patented May 5, 1970

3,509,582
HEART VALVE WITH PLASTIC COVERED CAGE LEGS
Will R. Pierie, Tustin, and Donald A. Raible, Corona, Calif., assignors, by mesne assignments, to American Hospital Supply Corporation, Evanston, Ill., a corporation of Illinois
Filed July 3, 1967, Ser. No. 650,852
Int. Cl. A61f 1/22
U.S. Cl. 3—1                                    5 Claims

ABSTRACT OF THE DISCLOSURE

A plastic covering for the metal cage legs of a heart valve having a metal valve member, to reduce noise and wear. In cages having a closed apex, the plastic covering is injection-molded over the cage legs. In cages having an open apex, the plastic covering is molded as a separate sleeve piece which is slipped over the ends of the cage legs.

CROSS REFERENCE TO RELATED APPLICATION

This application relates to a further development of a concept disclosed and claimed in application Ser. No. 587,806 filed Oct. 19, 1966, for "Heart Valve Prosthesis," which is assigned to the assignee of the instant application.

BACKGROUND OF THE INVENTION

This invention relates to improvements in heart valves and has particular reference to a plastic covering on a metal cage which retains a metal valve member.

The use of a metal valve member offers advantages in endurance and reliability in the body environment but the confinement of a metal valve member in a metal cage presents certain problems. The impact of the valve member against the end of the cage may produce objectionable noise and the sliding friction of the valve member along the cage legs may produce an unacceptable degree of wear on the parts. It is desirable to retain the strength and endurance reliability of the metal cage without the objectionable characteristics of noise and wear.

SUMMARY OF THE INVENTION

In the present construction the cage legs are covered with plastic. The plastic provides an improved bearing material for the sliding movement of the valve member and provides a silent and cushioned stop or abutment at the apex of the cage to receive the impact of the valve member at the limit of its opening movement. When the cage legs are integrally united to form a closed apex on the cage, the plastic may be molded directly on the cage.

When the ends of the cage legs are separated at the apex, the plastic covering is molded separately as a star-shaped sleeve piece with tubular spoke portions which are slipped over the cage legs. This form of construction allows a rigid valve member to be inserted through the apex opening after which the apex opening is closed by the sleeve piece to retain the ball in the cage. The end of each tubular spoke portion of the sleeve piece is provided with a tab which is secured to the orifice ring by the means employed to secure the suturing ring on the orifice ring. Thus, the sleeve piece not only provides a bearing element to reduce wear from sliding friction of the valve member and a noiseless abutment to receive the impact of the valve member but, also, provides a closure element for the open end of the cage for retaining the ball in the cage.

Objects of the invention are, therefore, to provide a plastic covering for the metal cage legs of a heart valve, to provide a preformed attachable covering for an open end cage and to provide a star-shaped sleeve piece for the purpose described.

The invention will be better understood and additional objects and advantages will become apparent from the following description of preferred embodiments of the invention illustrated in the accompanying drawing. Various changes may be made in the details of construction and arrangement of parts and certain features may be used without others.

BRIEF DESCRIPTION OF THE DRAWING

FIGURE 1 is a perspective view of a heart valve embodying the features of the invention;

FIGURE 2 is an enlarged view on the line 2—2 in FIGURE 1;

FIGURE 3 is a plan view of the plastic sleeve piece in FIGURES 1 and 2, showing the shape in which it is molded; and FIGURE 4 is a perspective view of the sleeve piece showing the shape it assumes on the valve cage.

DESCRIPTION OF THE PREFERRED EMBODIMENTS

By way of example, there is illustrated in FIGURES 1 and 2 one of the types of valves disclosed in Ser. No. 587,806 except that the cage is open at its apex. Also, the movable valve member, shown in phantom at 10 in FIGURE 1, is a hollow metal ball instead of a silicone rubber ball. It is to be understood, however, that the valve member may be of different shapes, such as a disc or lens and that the valve member may not be made entirely of metal.

The valve comprises a channel-shaped orifice or port ring 11 having cage legs 12 integral therewith. These parts are preferably cast of a suitable metal such as Stellite. Ring 11 is provided with openings 13 at intervals therearound. Ring 11 is covered with a porous cloth sleeve 14, the ends of which are folded into the outward facing channel. The downstream end of the sleeve is provided with slits to straddle the cage legs.

A cushion ring 15 of suitable material such as silicone foam rubber is enfolded in a second cloth sleeve 16, the ends of which are also disposed in the channel of ring 11. In assembling these parts the sleeve 14 is first applied to ring 11 as described and the upstream end of sleeve 16 is laid in the channel. The two ends of sleeve 14 and the upstream end of sleeve 16 are secured in the channel by a winding 20 of suitable material such as Teflon suture. Then cushion ring 15 is applied over winding 20 and the downstream end of sleeve 16 is folded around the cushion ring and tucked under it as shown. The two sleeves are stitched together at 21 on the upstream side and between the cage legs at 22 on the downstream side. Both sleeves are preferably equipped with draw strings as explained in Ser. No. 587,806.

The construction as thus far described is substantially the same as that disclosed in Ser. No. 587,806. Cushion ring 15 may assume different shapes as recognized in the art, a typical shape for mitral position being illustrated by way of example. This ring is suturable and its covering sleeve 16 provides for ingrowth of tissue. Cushion ring 15 and sleeve 16 together form a suturing ring for implantation as is understood in the art.

Sleeve 14 provides for ingrowth of tissue and forms a noiseless and relatively soft cushion seat for valve member 10. Openings 13 reduce the weight of the metal ring, allow ingrowth of tissue and allow for stitching sleeve 14 to the metal ring 11 when desired. Valve member 10 is assembled in the cage through the open apex end by springing the free ends 23 of the cage legs apart.

The apex opening in the cage is then closed by a star-shaped sleeve piece 30 preferably made of suitable plastic such as Teflon. The sleeve piece may be molded flat as shown in FIGURE 3. FIGURE 4 shows its shape when applied to the cage legs. The sleeve piece has a solid central hub portion 31 from which radiate tubular spoke portions 32 to fit over the cage legs 12. Each spoke 32 terminates in a flat tab 33 which is secured under the winding 20 in the channel of ring 11 as shown in FIGURE 2.

The sequence of assembly operations is as follows. Valve member 10 is assembled in the cage either before or after the first sleeve 14 is applied to ring 11. Then sleeve piece 30 is assembled on the cage and the upstream end portion of sleeve 16 is laid over spoke tabs 33 in preparation for the application of winding 20. The structure is completed by applying cushion ring 15, folding sleeve 16 over the cushion ring and stitching at 21, 22. All of the metal surfaces of the stationary structure are completely enclosed by either cloth or plastic so that there is no sliding friction, or impact, of metal on metal as the valve member moves in the cage.

FIGURE 1 also serves to illustrate the appearance of a closed end cage as shown in Ser. No. 587,806 having a plastic covering injection-molded directly on the cage. In such construction, the valve member 10 is assembled by forcing it laterally between the cage legs. This manner of assembly requires the cage legs to be more slender and springy since they are integrally joined together at the apex of the cage. The closed end type of cage may also be made separable from the port ring for assembly of the valve member, as disclosed in Ser. No. 587,806, with a plastic covering molded on the cage.

Having now described our invention and in what manner the same may be used, what we claim as new and desire to protect by Letters Patent is:

1. A heart valve comprising a port ring, a cage having a plurality of metal cage members on one side of said port ring, a movable valve member in said cage having a metallic surface engageable with said cage, a covering of flexible, plastic-like inert material on said cage members, said cage having an open apex and comprising a plurality of cage legs having free ends spaced apart from each other at said apex, said covering comprising a star-shaped sleeve piece having tubular spoke portions, said cage legs being inserted in said tubular spoke portions, and tabs on the ends of said spoke portions spaced from each other and secured to said port ring.

2. A heart valve comprising a port ring, an open end cage on one side of said port ring comprising a plurality of cage legs having free ends spaced apart from each other at the apex of the cage, a movable valve member in said cage, a star-shaped sleeve piece of flexible, plastic-like inert material having tubular spoke portions, said cage legs being inserted in said tubular spoke portions, and tabs on the ends of said spoke portions spaced from each other and secured to said port ring.

3. A heart valve as defined in claim 2 including a suturing ring on said port ring for implantation of the valve, and means securing said suturing ring to said port ring, said tabs being secured by said securing means.

4. A covering for the cage legs in a heart valve comprising a star-shaped sleeve piece of flexible, plastic-like inert material having tubular spoke portions radial to a central hub portion, and securement tabs spaced from each other on the ends of said spoke portions.

5. A covering for application to the cage legs of a heart valve comprising a sleeve piece of flexible, plastic-like inert material having a plurality of pre-formed tubular spoke portions radial to a central hub portion, the outer ends of said spoke portions being spaced from each other, said cage legs being insertable into said spoke portions.

References Cited

UNITED STATES PATENTS

| | | | |
|---|---|---|---|
| 3,130,419 | 4/1964 | Edwards | 3—1 |
| 3,143,742 | 8/1964 | Cromie | 3—1 |
| 3,365,728 | 1/1968 | Edwards et al. | 3—1 |

OTHER REFERENCES

"Mitral Replacements," by A. Starr et al., The Bulletin of the DOW Corning Center for Aid to Medical Research, vol. 4, No. 2, April 1962 (Midland, Mich.), p. 7 relied upon.

"Prosthetic Replacement of the Mitral Valve," The Lancet, Nov. 24, 1962, p. 1087.

"Stainless Steel Disc Valve for Cardiac Valve Replacement," by K. R. Williams et al., Journal of Thoracic and Cardiovacular Surgery, vol. 49, No. 4, April 1965, pp. 540–549.

RICHARD A. GAUDET, Primary Examiner

R. L. FRINKS, Assistant Examiner

U.S. Cl. X.R.

137—533.11, 533.13